(12) United States Patent
Arai et al.

(10) Patent No.: US 6,977,807 B2
(45) Date of Patent: Dec. 20, 2005

(54) LAMINATED SOLID ELECTROLYTIC CAPACITOR AND LAMINATED TRANSMISSION LINE DEVICE INCREASED IN ELEMENT LAMINATING NUMBER WITHOUT DETERIORATION OF ELEMENTS

(75) Inventors: Satoshi Arai, Sendai (JP); Sadamu Toita, Sendai (JP); Takayuki Inoi, Sendai (JP); Yoshihiko Saiki, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/920,069

(22) Filed: Aug. 17, 2004

(65) Prior Publication Data

US 2005/0047060 A1 Mar. 3, 2005

(30) Foreign Application Priority Data

Sep. 2, 2003 (JP) .............................. 2003-310358

(51) Int. Cl.$^7$ ............................................. H01G 9/00
(52) U.S. Cl. ................... 361/523; 361/524; 361/525; 361/528; 361/532; 29/25.03
(58) Field of Search ................................ 361/523–524, 361/528–529, 532–535, 538, 540, 508–516; 29/25.03

(56) References Cited

U.S. PATENT DOCUMENTS

| | | | |
|---|---|---|---|
| 5,377,073 A | 12/1994 | Fukaumi et al. | |
| 6,400,556 B1 * | 6/2002 | Masuda et al. | 361/523 |
| 6,563,693 B2 * | 5/2003 | Nakada et al. | 361/523 |
| 6,678,149 B2 * | 1/2004 | Matsumoto et al. | 361/523 |
| 6,680,841 B2 * | 1/2004 | Tadanobu et al. | 361/523 |
| 2003/0039093 A1 | 2/2003 | Tadanobu et al. | |
| 2004/0174660 A1 | 9/2004 | Arai et al. | |

FOREIGN PATENT DOCUMENTS

| | | |
|---|---|---|
| EP | 1 160 809 | 5/2001 |
| GB | 2 399 946 | 9/2004 |
| JP | 5-217811 | 8/1993 |
| JP | 6-168854 | 6/1994 |
| JP | 8-115855 | 5/1996 |
| JP | 10-144573 | 5/1998 |
| JP | 11-135367 | 5/1999 |
| JP | 11-135367 A | 5/1999 |

OTHER PUBLICATIONS

U.S. Appl. No. 10/779,025; Satoshi Arai et al; filed Feb. 13, 2004; "Stacked Solid Electrolytic Capacitor and Stacked Transmission Line Element".

* cited by examiner

Primary Examiner—Nguyen T. Ha
(74) Attorney, Agent, or Firm—Frishauf, Holtz, Goodman & Chick, P.C.

(57) ABSTRACT

In a laminated solid electrolytic capacitor including a plurality of solid electrolytic capacitor elements, first end regions of anode bodies of the solid electrolytic capacitor elements adjacent to each other are mechanically connected to each other through a spacer. First end surfaces of the anode bodies of the solid electrolytic capacitor elements adjacent to each other are electrically connected to each other through an electrically conductive member.

20 Claims, 15 Drawing Sheets

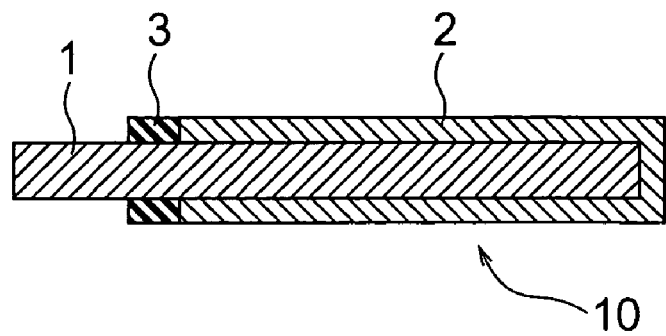
FIG. 1 EXISTING ART
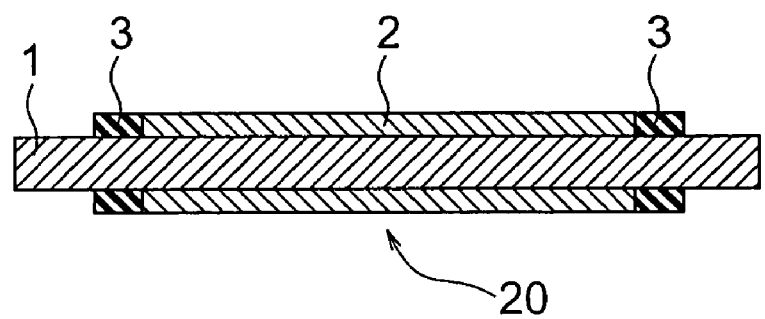
FIG. 2 EXISTING ART

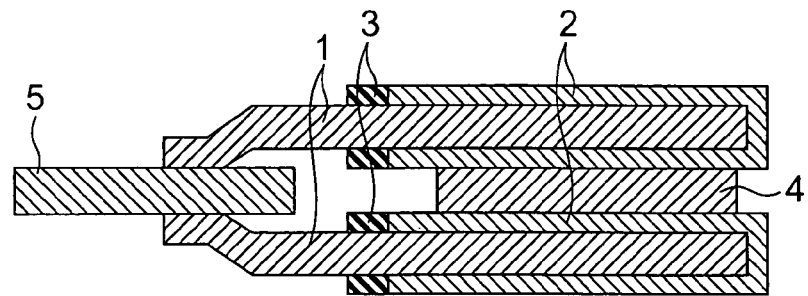
FIG. 3 EXISTING ART
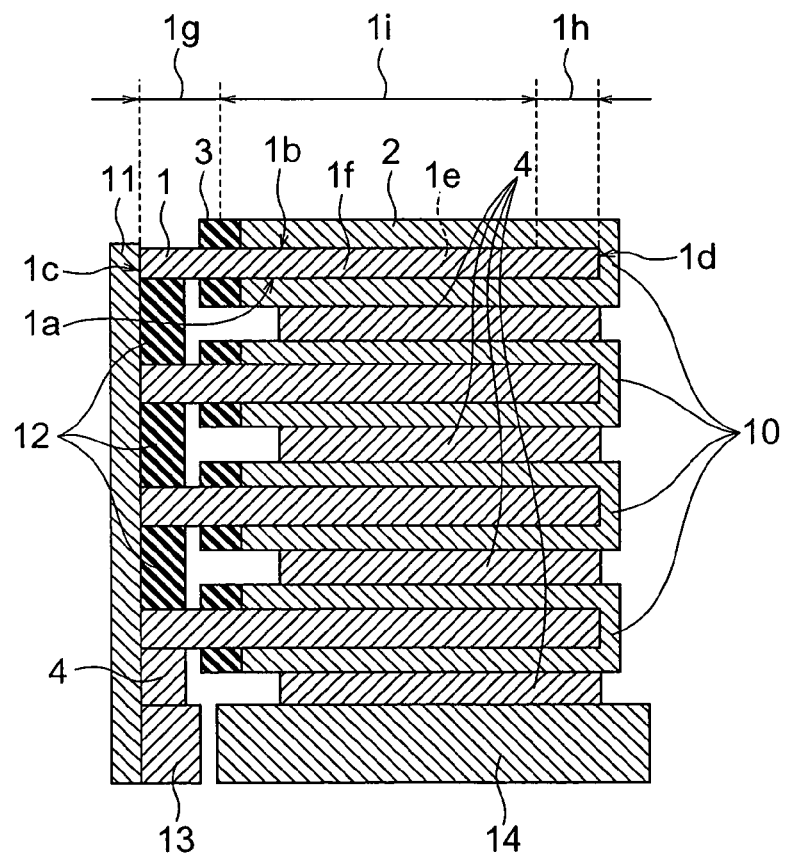
FIG. 4

LAMINATED SOLID ELECTROLYTIC CAPACITOR AND LAMINATED TRANSMISSION LINE DEVICE INCREASED IN ELEMENT LAMINATING NUMBER WITHOUT DETERIORATION OF ELEMENTS

This application claims priority to prior Japanese patent application JP 2003-310358, the disclosure of which is incorporated herein by reference.

BACKGROUND OF THE INVENTION

This invention relates to a solid electrolytic capacitor and a transmission line device both of which is applicable to various fields such as a noise filter or a smoothing device and, in particular, to a laminated solid electrolytic capacitor comprising a plurality of solid electrolytic capacitor elements integrally laminated onto one another and a laminated transmission line device comprising a plurality of transmission line elements integrally laminated onto one another.

This kind of laminated solid electrolytic capacitor comprises a plurality of solid electrolytic capacitor elements. The solid electrolytic capacitor elements are provided with an anode body, a dielectric layer, and a cathode body, respectively. The dielectric layer is served by an oxidized film formed on the anode body. Alternatively, this kind of laminated transmission line device is like in structure to the laminated solid electrolytic capacitor mentioned above. Namely, the laminated transmission line device comprises a plurality of transmission line elements. The transmission line elements are also provided with an anode body, a dielectric layer, and a cathode body, respectively. The dielectric layer is served by an oxidized film formed on the anode body.

Generally, it is requested for the laminated solid electrolytic capacitor and the laminated transmission line device to have large capacity and low impedance. It is effective to increase the capacity and to reduce the impedance of the laminated solid electrolytic capacitor or the laminated transmission line device that the number of the solid electrolytic capacitor element or the transmission line element is increased. However, because the size of the impedance of the laminated solid electrolytic capacitor or the laminated transmission line device is increased, it is not preferred only that the number of the solid electrolytic capacitor element or the transmission line element is increased. In order to satisfy both to increase the capacity and to reduce the impedance, it is useful to laminate the solid electrolytic capacitor elements or the transmission line elements onto one another in a thickness direction of the elements.

As an example in which the solid electrolytic capacitor elements are laminated onto one another in the thickness direction, a laminated solid electrolytic capacitor comprising two solid electrolytic capacitor elements laminated to each other is disclosed in Japanese Patent Application Publication (JP-A) No. H11-135367. In the existing laminated solid electrolytic capacitor, cathode bodies of the solid electrolytic capacitor elements are connected to each other by electrically conductive adhesive. End regions of anode bodies of the solid electrolytic capacitor elements are jointed to a lead frame by welding. When the end regions are jointed to the lead frame, the end regions of the anode bodies each of which has a straight shape are pressed in a direction so as to close in with each other. Therefore, each of the end regions are deformed (bent) into a stepwise shape.

In the existing laminated solid electrolytic capacitor, because the end regions of the anode bodies are deformed (bent) when the end regions are jointed to the lead frame, stress caused by the deforming may be reached each of the cathode bodies which have been formed on each of the anode bodies. If large stress is impressed on the cathode body, an oxidized film as a dielectric layer formed between the anode body and the cathode body is damaged. Therefore, the solid electrolytic capacitor element is deteriorated in performance. Particularly, when many solid electrolytic capacitor elements are laminated, the more the solid electrolytic capacitor element is laminated at peripheral layer, the more the anode body is deformed. Therefore, when many solid electrolytic capacitor elements are laminated, a possibility that the performance of the solid electrolytic capacitor elements is deteriorated becomes higher. Therefore, in the existing laminated solid electrolytic capacitor, a limit on the number of the solid electrolytic capacitor elements laminated was practically two. There is also such disadvantage in the transmission line elements of the laminated transmission line device like to the solid electrolytic capacitor elements in structure.

Such as a laminated solid electrolytic capacitor or a laminated transmission line device laminated is also disclosed in the copending U.S. patent application Ser. No. 10/779,025 filed on Feb. 13, 2004 by the present applicants.

SUMMARY OF THE INVENTION

Therefore, It is a technical object of this invention to increase the number of solid electrolytic capacitor elements laminated without deterioration of their performance and therefore to provide a laminated solid electrolytic capacitor reduced in size, remarkably increased in capacity, and remarkably reduced in impedance.

It is another object of this invention to increase the number of transmission line elements laminated without deterioration of their performance and therefore to provide a laminated transmission line device reduced in size, remarkably increased in capacity, and remarkably reduced in impedance.

According to this invention, there is provided a laminated solid electrolytic capacitor comprising a plurality of solid electrolytic capacitor elements, the solid electrolytic capacitor elements being provided with an anode body, a dielectric layer, and a cathode body, respectively, the anode body having a substantially plate-shape provided with first and second plate surfaces, two side surfaces, and first and second end surfaces, the laminated solid electrolytic capacitor being structured by laminating the solid electrolytic capacitor elements onto one another in a thickness direction of the anode body. The anode body is provided with first and second end regions and an intermediate region. The dielectric layer is served by an oxidized film formed on the first and the second plate surfaces and the side surfaces in the intermediate and the second end regions and on the second end surface of the anode body. The cathode body is formed on the dielectric layer. The first end regions of the anode bodies of the solid electrolytic capacitor elements adjacent to each other are mechanically connected to each other through a spacer. The first end surfaces of the anode bodies of the solid electrolytic capacitor elements adjacent to each other are electrically connected to each other through an electrically conductive member.

According to this invention, there is also provided a laminated transmission line device comprising a plurality of transmission line elements, the transmission line elements being provided with an anode body, a dielectric layer, and a cathode body, respectively, the anode body having a substantially plate-shape provided with first and second plate surfaces, two side surfaces, and first and second end surfaces, the laminated transmission line device being structured by laminating the transmission line elements onto one another in a thickness direction of the anode body. The anode body is provided with first and second end regions and an intermediate region. The dielectric layer is served by an oxidized film formed on the first and the second plate surfaces and the side surfaces in the intermediate region of the anode body. The cathode body is formed on the dielectric layer. The first end regions of the anode bodies of the transmission line elements adjacent to each other are mechanically connected to each other through a spacer. The second end regions of the anode bodies of the transmission line elements adjacent to each other are mechanically connected to each other through the spacer. The first end surfaces of the anode bodies of the transmission line elements adjacent to each other are electrically connected to each other through an electrically conductive member. The second end surfaces of the anode bodies of the transmission line elements adjacent to each other are electrically connected to each other through the electrically conductive member.

Further structures and advantages of this invention will become clear as the description proceeds.

BRIEF DESCRIPTION OF THE DRAWING

FIG. 1 is a sectional view showing an example of the existing solid electrolytic capacitor element;

FIG. 2 is a sectional view showing an example of the existing transmission line element;

FIG. 3 is a sectional view showing the existing laminated solid electrolytic capacitor;

FIG. 4 is a sectional view showing a laminated solid electrolytic capacitor according to a first embodiment of this invention;

DESCRIPTION OF THE PREFERRED EMBODIMENTS

Figure 5A:
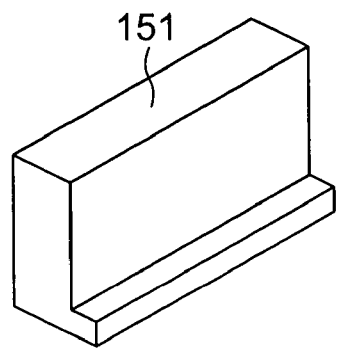
FIG. 5A is a perspective view showing a metal cap used in a second embodiment of this invention.

In order to facilitate an understanding of this invention, the existing technique mentioned in the background of the specification will be described at first.

Referring to FIG. 1, an existing solid electrolytic capacitor element 10 having a substantially plate-shape is manufactured as follows.

First, an anode body 1 is provided. The anode body 1 is manufactured as follows. For example, a metal plate made from a simple body of valve function metal such as aluminum, tantalum, niobium, or titanium is prepared. Alternatively, a metal plate made from alloy valve consisting of the function metals may be prepared. The metal plate is etched so as to have a porous surface structure and thus the anode body 1 is provided. Alternatively, the anode body 1 may be provided by sintering and unifying a metal plate made from the valve function metal and metal powder of the valve function metal.

An oxidized film is formed on the entire surface of the anode body 1. The oxidized film is not shown in FIG. 1.

At a leftward portion of the anode body 1 provided with the oxidized film, an electrical insulation resin member 3 is formed so as to extend over lower and upper plate surfaces and two side surfaces of the anode body 1. Consequently, the surface of the anode body 1 provided with the oxidized film is divided into two regions, namely, left and right regions in FIG. 1.

On the right region of the surface of the anode body 1, a solid electrolytic layer, a graphite layer, and a silver paste layer are sequentially formed and thus a cathode body 2 is formed. Alternatively, the cathode body 2 may be formed by sequentially forming on the right region of the anode body 1 a solid electrolytic layer, a graphite layer, and a metal plating layer. Furthermore, the cathode body 2 may be formed by sequentially forming on the right region a solid electrolytic layer and a metal plating layer.

The oxidized film formed on the left region of the surface of the anode body 1 is removed.

As mentioned above, the solid electrolytic capacitor element 10 was manufactured. The oxidized film formed on the right region of the surface of the anode body 1 serves as a dielectric layer of the solid electrolytic capacitor element 10.

FIG. 2 shows an example of a transmission line element having a substantially plate-shape proposed by the applicant. Referring to FIG. 2, an existing transmission line element 20 is manufactured as follows.

First, an anode body 1 is provided like the process of manufacturing the solid electrolytic capacitor element shown in FIG. 1.

Like the process of manufacturing the solid electrolytic capacitor element shown in FIG. 1, an oxidized film is formed on the entire surface of the anode body 1. The oxidized film is not shown in FIG. 2.

On regions as shown in FIG. 2 of the surface of the anode body 1 provided with the oxidized film, electrical insulation resin members 3 are formed.

At leftward and rightward portions of the anode body 1 provided with the oxidized film, electrical insulation resin members 3 are formed so as to extend over lower and upper plate surfaces and two side surfaces of the anode body 1, respectively. Consequently, the surface of the anode body 1 provided with the oxidized film is divided into three regions, namely, left, intermediate, and right regions in FIG. 2.

On the intermediate region of the surface of the anode body 1, a solid electrolytic layer, a graphite layer, and a silver paste layer are sequentially formed and thus a cathode body 2 is formed. Alternatively, the cathode body 2 may be formed by sequentially forming on the intermediate region of the anode body 1 a solid electrolytic layer, a graphite layer, and a metal plating layer. Furthermore, the cathode body 2 may be formed by sequentially forming on the intermediate region a solid electrolytic layer and a metal plating layer.

The oxidized films formed on the left and right regions of the surface of the anode body 1 are removed.

Thus, the transmission line element 20 was manufactured. The oxidized film formed on the intermediate region of the surface of the anode body 1 serves as a dielectric layer of the transmission line element 20.

FIG. 3 shows a laminated solid electrolytic capacitor like the laminated solid electrolytic capacitor disclosed in the Japanese Patent Application Publication (JP-A) No. H11-135367. As shown in FIG. 3, two solid electrolytic capacitor elements are connected to each other by electrically conductive adhesive 4. End regions of anode bodies 1 of the solid electrolytic capacitor elements are jointed to a lead frame 5 by welding. When the end regions are jointed to the lead frame 5, the end regions of the anode bodies each of which has a straight shape are pressed in a direction so as to close in with each other. Therefore, each of the end regions are deformed (bent) into a stepwise shape.

The laminated solid electrolytic capacitor or laminated transmission line device mentioned above has the advantages and the disadvantages described above in the background of the specification.

Next, preferred embodiments of this invention will be described with reference to the drawing.

First Embodiment

Referring to FIG. 4, in a laminated solid electrolytic capacitor according of a first embodiment of this invention, four solid electrolytic capacitor elements 10 are laminated to one another.

Each of solid electrolytic capacitor elements 10 is provided with an anode body 1, an oxidized film as a dielectric layer (not shown), a cathode body 2, and an insulation resin member 3, like the solid electrolytic capacitor element 10 shown in FIG. 1. Because the process of manufacturing each of the solid electrolytic capacitor elements 10 is the same as the process described in conjunction with FIG. 1, detailed description thereof will be omitted herein.

The anode body 1 of each of the solid electrolytic capacitor elements 10 has a substantially plate-shape provided with first and second plate surfaces 1a and 1b as lower and upper surfaces in FIG. 4, two side surfaces 1e and 1f, and first and second end surfaces 1c and 1d as left and right elevational surfaces in FIG. 4. The laminated solid electrolytic capacitor is structured by laminating four solid electrolytic capacitor elements 10 onto one another in a thickness direction of the anode body 1. The anode body 1 is provided with a first end region 1g as a left region in FIG. 4, a second end region 1h as a right region, and an intermediate region 1i. The dielectric layer is served by the oxidized film formed over the first and the second plate surfaces 1a and 1b and the side surfaces 1e and 1f on the intermediate and the second end regions 1h and at the second end surface 1d of each of the anode bodies 1. The cathode body is formed on the dielectric layer.

The first end regions 1g of the anode bodies 1 of the solid electrolytic capacitor elements 10 adjacent to each other are mechanically connected and electrically insulated to each other through an electrical insulation spacer 12. Because the first end regions 1g are mechanically connected to each other, the disadvantageous deformation of the anode body and the vicinity does not occur. In the present invention, even if the spacer can mechanically connect between the anode bodies 1, the spacer may have an electrical insulation characteristic or not.

Furthermore, the first end surfaces 1c of the anode bodies 1 of the solid electrolytic capacitor elements 10 adjacent to each other are mechanically electrically connected to each other through an electrically conductive member 11.

Herein, the electrical insulation spacer 12 can be made from an adhesive, made of an adhesive sheet, and so on. Further, the adhesive can be served by electrical insulation adhesive or electrically-conductive adhesive. Also, the adhesive sheet can be served by an electrical insulation adhesive sheet or an electrically-conductive adhesive sheet.

Further, as the electrically conductive member 11, such as an evaporated metal film, a metal plating film, a metal plate, or an electrically conductive paste film can be used.

The cathode bodies 2 of the solid electrolytic capacitor elements 10 adjacent to each other are mechanically electrically connected to each other through an electrically conductive adhesive 4.

A part of the first plate surface 1a of the anode body 1 of the solid electrolytic capacitor element 10 undermost laminated and a part of an inside surface of a lower region of the electrically conductive member 11 are mechanically electrically connected to an anode terminal 13 made of a metal plate through the electrically conductive adhesive 4. Also, a part of a lower surface of the cathode body 2 of the solid electrolytic capacitor element 10 undermost laminated is mechanically electrically connected to a cathode terminal 14 made of a metal plate through the electrically conductive adhesive 4.

Because the laminated solid electrolytic capacitor of the first embodiment comprises the above-mentioned structure, it is unnecessary to bend the end region of the anode body like the existing laminated solid electrolytic capacitor and thus the solid electrolytic capacitor element may not be deteriorated.

Although four solid electrolytic capacitor elements are laminated in the first embodiment, less or more than four solid electrolytic capacitor elements may be laminated.

Second Embodiment

A second embodiment of this invention is an embodiment that a metal cap is used as the electrically conductive member for electrically connecting between the first end surfaces of the anode bodies. The metal cap has a shape so as to cover a part or the entire of the first end region of the anode body.

Figure 5B:
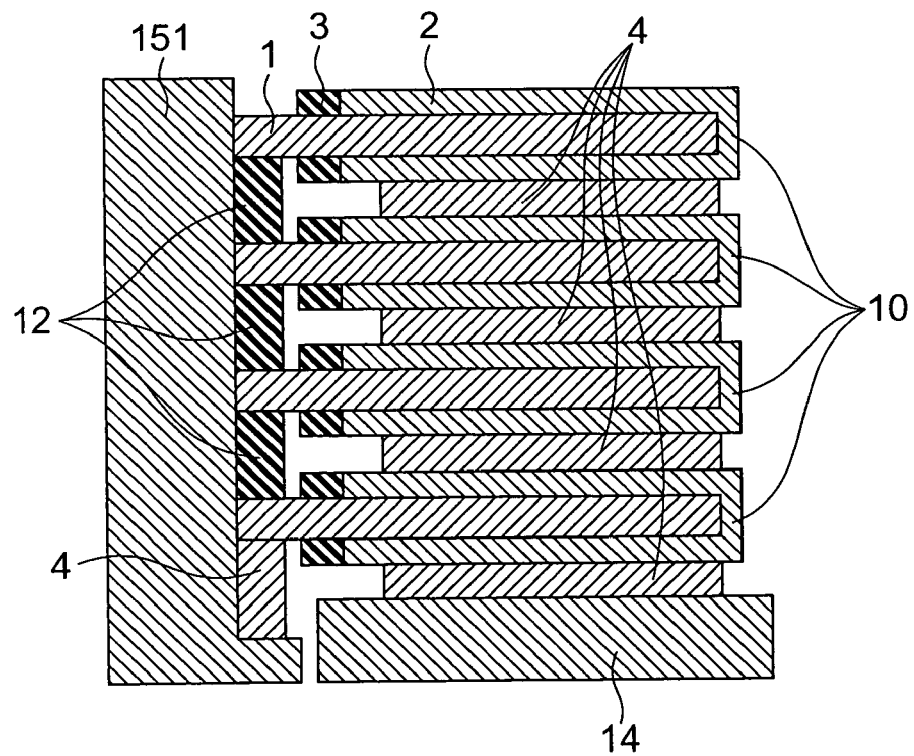
FIG. 5B is a sectional view showing a laminated solid electrolytic capacitor according to the second embodiment of this invention.

FIG. 5A shows a metal cap 151 used in the second embodiment. FIG. 5B is a sectional view of a laminated solid electrolytic capacitor using therein the metal cap 151.

Referring to FIG. 5B, the laminated solid electrolytic capacitor comprises four solid electrolytic capacitor elements 10 laminated to one another. Each of solid electrolytic capacitor elements 10 is provided with an anode body 1, an oxidized film as a dielectric layer (not shown), a cathode body 2, and an insulation resin member 3, like the solid electrolytic capacitor element 10 shown in FIG. 1.

The first end regions of the anode bodies 1 of the solid electrolytic capacitor elements 10 adjacent to each other are mechanically connected and electrically insulated to each other through an electrical insulation spacer 12.

Furthermore, the first end surfaces of the anode bodies 1 of the solid electrolytic capacitor elements 10 adjacent to each other are mechanically electrically connected to each other through a metal cap 151. A lower region of the metal cap 151 serves as an anode terminal.

The cathode bodies 2 of the solid electrolytic capacitor elements 10 adjacent to each other are mechanically electrically connected to each other through an electrically conductive adhesive 4.

A part of the first plate surface of the anode body 1 of the solid electrolytic capacitor element 10 undermost laminated is mechanically electrically connected to a lower region of the metal cap 151 as the anode terminal through the electrically conductive adhesive 4. Also, a part of a lower surface of the cathode body 2 of the solid electrolytic capacitor element 10 undermost laminated is mechanically electrically connected to a cathode terminal 14 made of a metal plate through the electrically conductive adhesive 4.

Figure 6A:
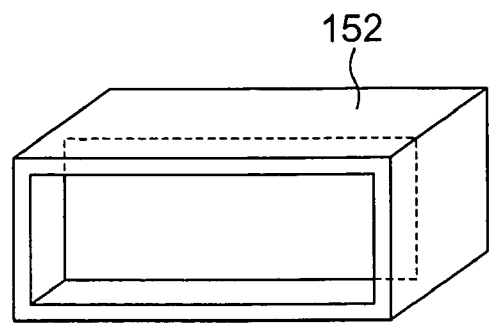
FIG. 6A is a perspective view showing another metal cap used in a variation of the second embodiment of this invention.
Figure 6B:
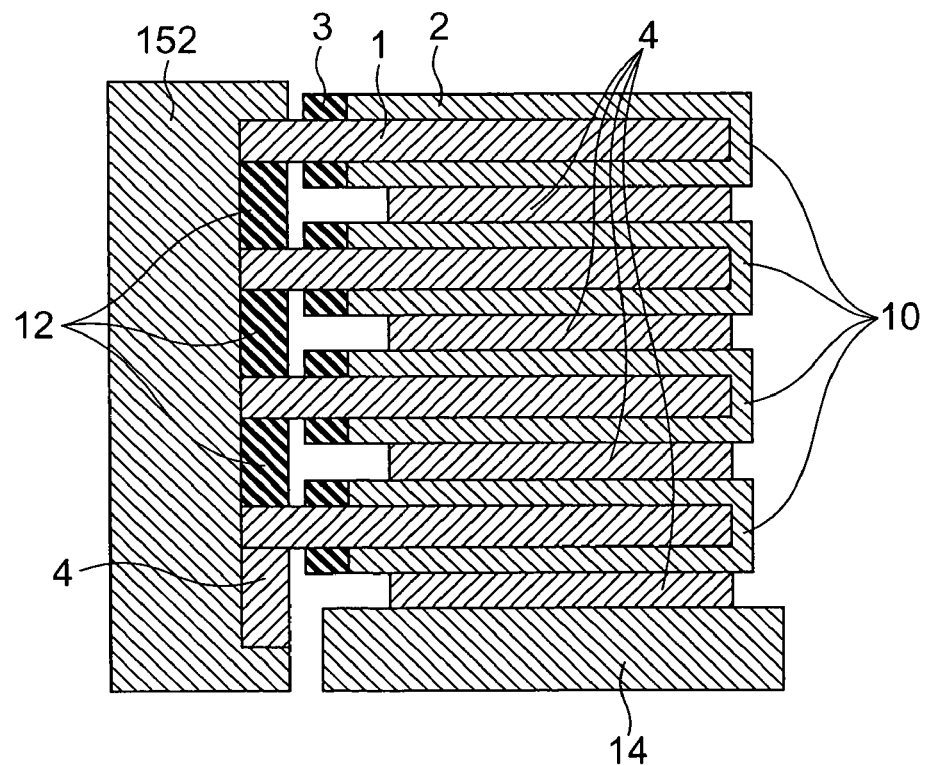
FIG. 6B is a sectional view showing another laminated solid electrolytic capacitor according to the variation of the second embodiment of this invention;.

FIG. 6A shows a metal cap 152 used in another variation of the second embodiment. FIG. 6B is a sectional view of a laminated solid electrolytic capacitor using therein the metal cap 152.

Referring to FIG. 6B, the laminated solid electrolytic capacitor comprises four solid electrolytic capacitor elements 10 laminated to one another. Each of solid electrolytic capacitor elements 10 is provided with an anode body 1, an oxidized film as a dielectric layer (not shown), a cathode body 2, and an insulation resin member 3, like the solid electrolytic capacitor element 10 shown in FIG. 1.

The first end regions of the anode bodies 1 of the solid electrolytic capacitor elements 10 adjacent to each other are mechanically connected and electrically insulated to each other through an electrical insulation spacer 12.

Furthermore, the first end surfaces of the anode bodies 1 of the solid electrolytic capacitor elements 10 adjacent to each other are mechanically electrically connected to each other through a metal cap 152. A lower region of the metal cap 152 serves as an anode terminal.

The cathode bodies 2 of the solid electrolytic capacitor elements 10 adjacent to each other are mechanically electrically connected to each other through an electrically conductive adhesive 4.

A part of the first plate surface of the anode body 1 of the solid electrolytic capacitor element 10 undermost laminated is mechanically electrically connected to a lower region of the metal cap 152 as the anode terminal through the electrically conductive adhesive 4. The second plate surface of the anode body 1 of the solid electrolytic capacitor element 10 uppermost laminated is mechanically electrically connected to an upper region of the metal cap 152 through the electrically conductive adhesive (not shown). Furthermore, although not shown, the side surfaces of each of the anode bodies 1 of the solid electrolytic capacitor element 10 are mechanically electrically connected to side regions of the metal cap 152 through the electrically conductive adhesive.

Also, a part of a lower surface of the cathode body 2 of the solid electrolytic capacitor element 10 undermost laminated is mechanically electrically connected to the cathode terminal 14 made of a metal plate through the electrically conductive adhesive 4.

Because the laminated solid electrolytic capacitor of the second embodiment comprises the above-mentioned structure, it is unnecessary to bend the end region of the anode body like the existing laminated solid electrolytic capacitor and thus the solid electrolytic capacitor element may not be deteriorated.

Although four solid electrolytic capacitor elements are laminated in the second embodiment, less or more than four solid electrolytic capacitor elements may be laminated.

Third Embodiment

In a third embodiment of this invention, a first end region of an anode body of a solid electrolytic capacitor element is previously bent in right angle by the use of a jig before the elements are laminated on one another so that a first or a second plate surface serves as a first end surface extended in area. Consequently, the area of the anode body contacting to an electrically conductive member is increased. When the contacting area is increased, the electrical resistance between the anode body and the electrically conductive member is reduced.

Figure 7:
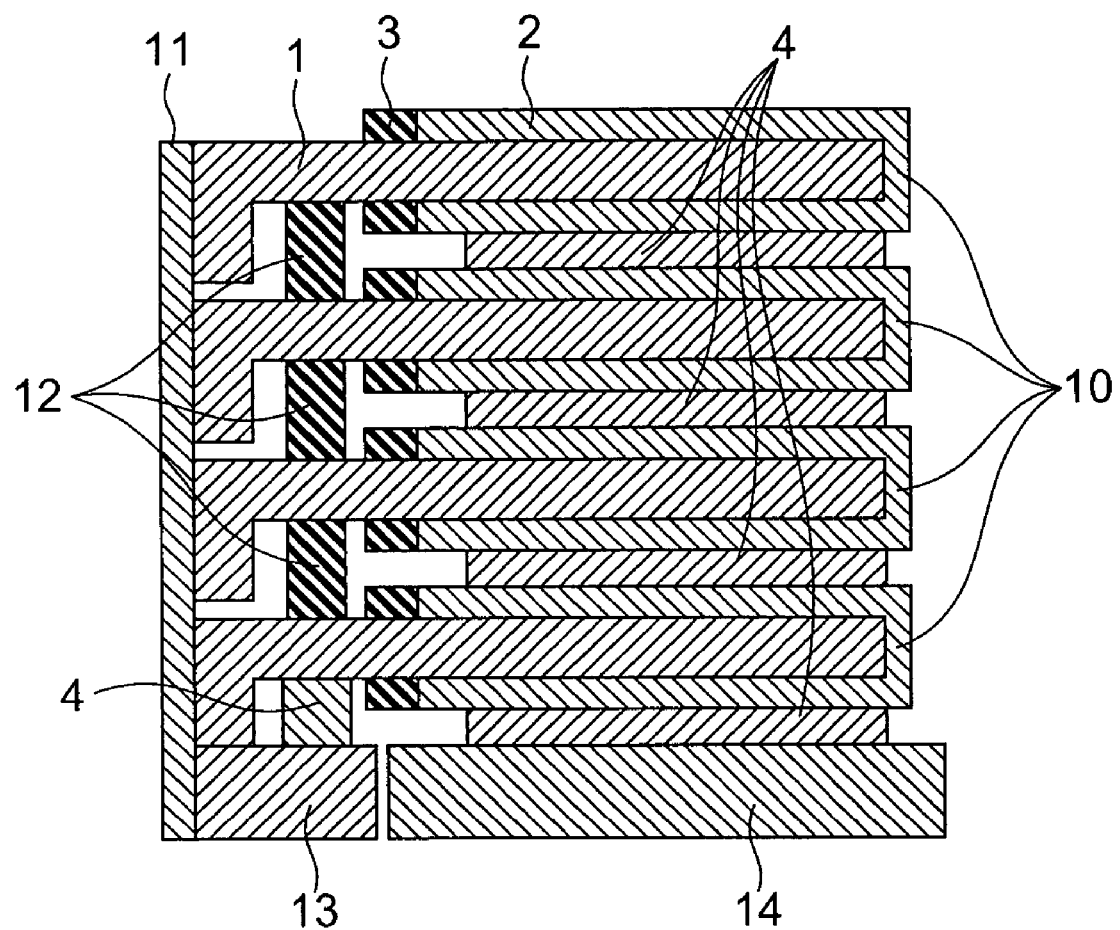
FIG. 7 is a sectional view showing a laminated solid electrolytic capacitor according to a third embodiment of this invention.

Referring to FIG. 7, the laminated solid electrolytic capacitor comprises four solid electrolytic capacitor elements 10 laminated to one another. Each of solid electrolytic capacitor elements 10 is provided with an anode body 1, an oxidized film as a dielectric layer (not shown), a cathode body 2, and an insulation resin member 3, like the solid electrolytic capacitor element 10 shown in FIG. 1.

The first end regions of the anode bodies 1 of the solid electrolytic capacitor elements 10 adjacent to each other are mechanically connected and electrically insulated to each other through an electrical insulation spacer 12.

Furthermore, the first end surfaces of the anode bodies 1 of the solid electrolytic capacitor elements 10 adjacent to each other are mechanically electrically connected to each other through an electrically conductive member 11.

The cathode bodies 2 of the solid electrolytic capacitor elements 10 adjacent to each other are mechanically electrically connected to each other through an electrically conductive adhesive 4.

The first end region of each of the anode bodies 1 of the solid electrolytic capacitor elements 10 is previously bent in right angle by the use of a jig (not shown) before the elements are laminated on one another so that the first or the second plate surface serves as the first end surface extended in area, as shown in FIG. 7. Consequently, an area of the anode body 1 contacting to the electrically conductive member 11 is increased. When the contacting area is increased, the electrical resistance between the anode body 1 and the electrically conductive member 11 is reduced.

A part of the first plate surface of the anode body 1 of the solid electrolytic capacitor element 10 undermost laminated and a part of an inside surface of a lower region of the electrically conductive member 11 are mechanically electrically connected to an anode terminal 13 made of a metal plate through the electrically conductive adhesive 4. Also, a part of a lower surface of the cathode body 2 of the solid electrolytic capacitor element 10 undermost laminated is mechanically electrically connected to a cathode terminal 14 made of a metal plate through the electrically conductive adhesive 4.

Because the laminated solid electrolytic capacitor of the third embodiment comprises the above-mentioned structure, electrical conductivity between the anode body 1 and the electrically conductive member 11 is excellent and therefore the impedance of the laminated solid electrolytic capacitor is low. Further, because the first end region of the anode body 1 has been previously bent by the use of the jig before the elements are laminated on one another, stress caused by the bending is never reached the cathode body 2 formed on the anode body 1. Consequently, the oxidized film as the dielectric layer formed between the anode body 1 and the cathode body 2 is never damaged. Thus, the solid electrolytic capacitor element is never deteriorated in performance.

Although four solid electrolytic capacitor elements are laminated in the third embodiment, less or more than four solid electrolytic capacitor elements may be laminated.

Fourth Embodiment

In the first to the third embodiments, the electrically conductive adhesive 4 is used for the connection between the cathode bodies 2 adjacent to each other and the connection between the cathode body 2 and the cathode terminal 14 adjacent to each other. In a fourth embodiment of this invention, another means is used for the connections.

Figure 8A:
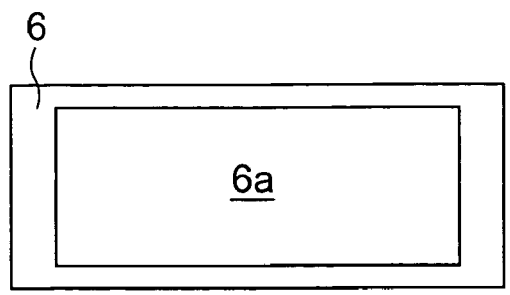
FIG. 8A is a plan view showing an electrical insulation adhesive sheet provided with a hole portion used in a fourth embodiment of this invention.
Figure 8B:
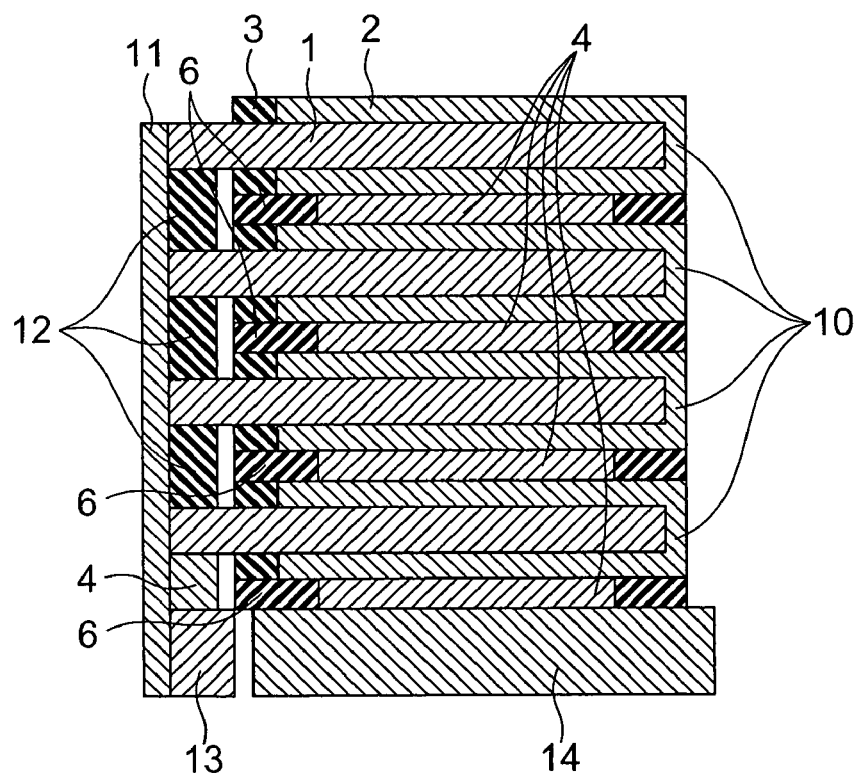
FIG. 8B is a sectional view showing a laminated solid electrolytic capacitor according to the fourth embodiment of this invention.

Referring to FIG. 8B, a laminated solid electrolytic capacitor according to the fourth embodiment comprises four solid electrolytic capacitor elements 10 laminated to one another. Each of solid electrolytic capacitor elements 10 is provided with an anode body 1, an oxidized film as a dielectric layer (not shown), a cathode body 2, and an insulation resin member 3, like the solid electrolytic capacitor element 10 shown in FIG. 1.

The first end regions of the anode bodies 1 of the solid electrolytic capacitor elements 10 adjacent to each other are mechanically connected and electrically insulated to each other through an electrical insulation spacer 12.

Furthermore, the first end surfaces of the anode bodies 1 of the solid electrolytic capacitor elements 10 adjacent to each other are mechanically electrically connected to each other through an electrically conductive member 11.

A part of the first plate surface of the anode body 1 of the solid electrolytic capacitor element 10 undermost laminated and a part of an inside surface of a lower region of the electrically conductive member 11 are mechanically electrically connected to an anode terminal 13 made of a metal plate through the electrically conductive adhesive 4.

In the laminated solid electrolytic capacitor of the fourth embodiment, the cathode bodies 2 to one another as well as the cathode body 2 and a cathode terminal 14 are mechanically connected by an electrical insulation adhesive sheet 6 shown in FIG. 8A, respectively. The electrical insulation adhesive sheet 6 is excellent in adhesive properties more than the electrically conducive adhesive 4 and has a frame shape provided with a hole portion 6a. As shown in FIG. 8B, the electrically conductive adhesive 4 is filled in the hole portion 6a. The cathode bodies 2 to one another as well as the cathode body 2 and the cathode terminal 14 are electrically connected by the electrically conductive adhesive 4 filled in the hole portion 6a, respectively.

Figure 9A:
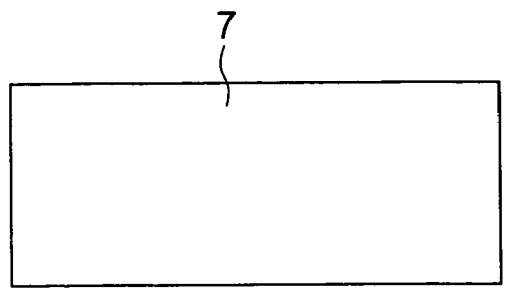
FIG. 9A is a plan view showing an electrical insulation adhesive sheet without a hole portion used in a variation of the fourth embodiment of this invention.
Figure 9B:
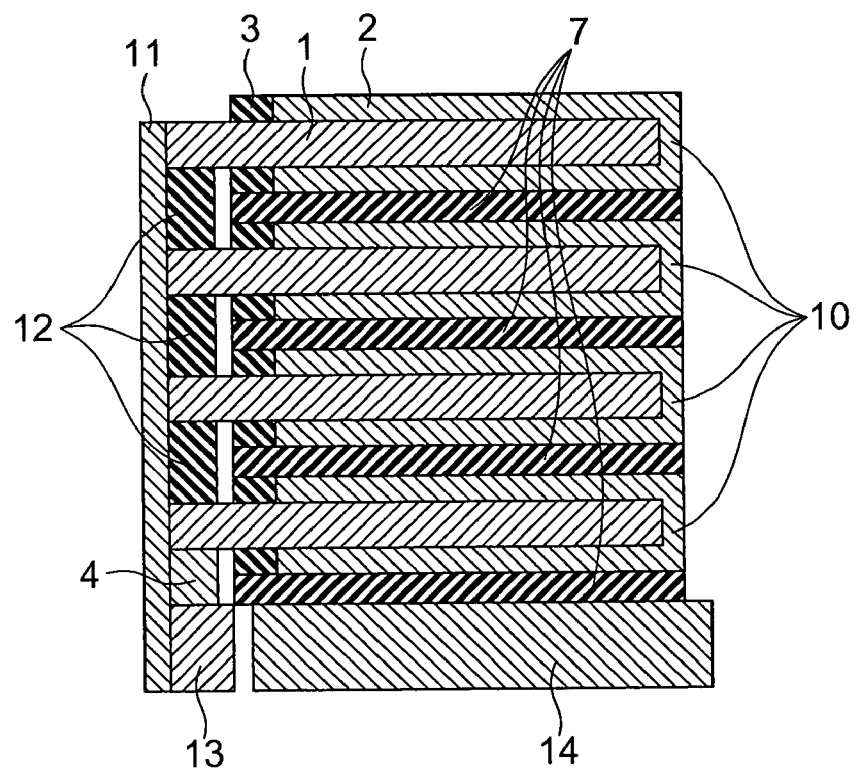
FIG. 9B is a sectional view showing another laminated solid electrolytic capacitor according to the variation of the fourth embodiment of this invention.

Referring to FIG. 9B, in the laminated solid electrolytic capacitor of another embodiment of the fourth embodiment, the cathode bodies 2 to one another as well as the cathode body 2 and the cathode terminal 14 are mechanically connected by an electrical insulation adhesive sheet 7 shown in FIG. 9A instead of the electrical insulation adhesive sheet 6, respectively. The electrical insulation adhesive sheet 7 is excellent in adhesive properties more than the electrically conducive adhesive 4 has a plate shape not provided with a hole portion.

Each of the cathode bodies 2 of the solid electrolytic capacitor elements 10 has a hollow plate shape provided with first and second plate surfaces as lower and upper surface in FIG. 9B, a pair of side surfaces, and a second end surface as a right end surface in FIG. 9B. The first and second plate surfaces, the side surfaces, and the second end surfaces of the cathode body 2 correspond to the first and second plate surfaces, the side surfaces, and the second end surfaces of the anode body 1, respectively.

Figure 9C:
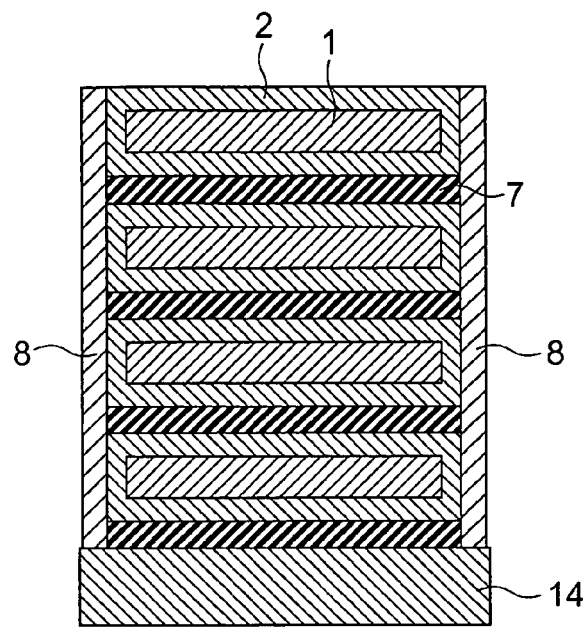
FIG. 9C is another sectional view showing another laminated solid electrolytic capacitor according to the variation of the fourth embodiment of this invention.
Figure 9D:
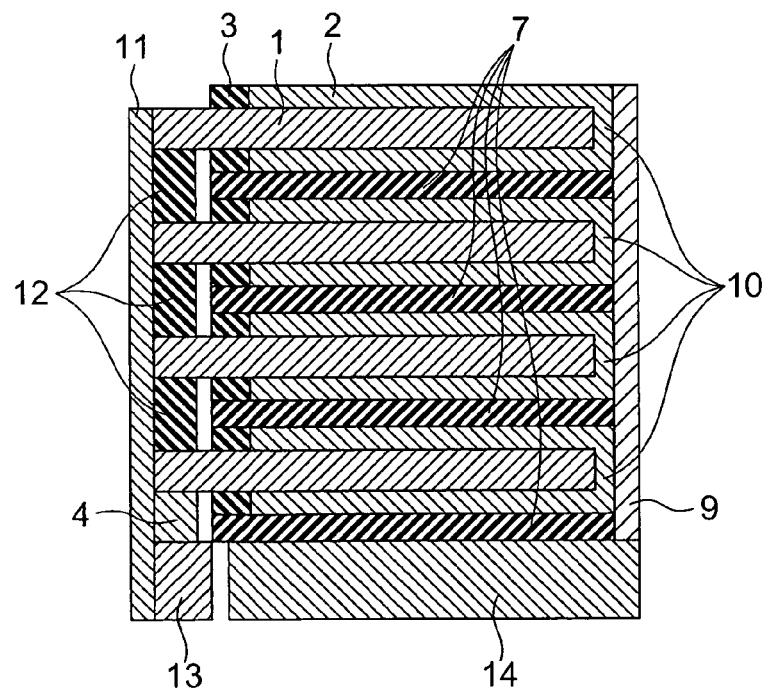
FIG. 9D is a sectional view showing another laminated solid electrolytic capacitor according to another variation of the fourth embodiment of this invention.

The cathode bodies 2 to one another and the cathode body 2 and the cathode terminal 14 are electrically connected by electrically connecting means, respectively. The electrically connecting means is arranged between the side surfaces and/or the second end surfaces of the cathode bodies 2 of the solid electrolytic capacitor elements 10 laminated to one another. For example, the electrically connecting means is implemented by electrically conductive paste applied over the side surfaces of the laminated cathode bodies. In more concrete, electrically conductive paste layers 8 can be applied over a pair of the side surfaces of the cathode bodies 2 laminated on one another, respectively, as shown in FIG. 9C. Alternatively, an electrically conductive paste layer 9 may be applied over the second end surfaces of the cathode bodies 2 laminated on one another, respectively, as shown in FIG. 9D.

The laminated solid electrolytic capacitor illustrated in FIGS. 8B and 9B respectively comprise, for the connection between the cathode bodies 2 adjacent to each other and the connection between the cathode body 2 and the cathode terminal 14 adjacent to each other, the electrical insulation sheet 6 or 7 excellent in adhesive properties more than the electrically conducive adhesive 4. Thus, reliability and durability of the connection between the cathode bodies 2 adjacent to each other and the connection between the cathode body 2 and the cathode terminal 14 adjacent to each other are increased.

Because the laminated solid electrolytic capacitor of the fourth embodiment comprises the above-mentioned structure, it is unnecessary to bend the end region of the anode body like the existing laminated solid electrolytic capacitor and thus the solid electrolytic capacitor element may not be deteriorated.

Although four solid electrolytic capacitor elements of four are laminated in the fourth embodiment, less or more than four solid electrolytic capacitor elements may be laminated.

Fifth Embodiment

Figure 10:
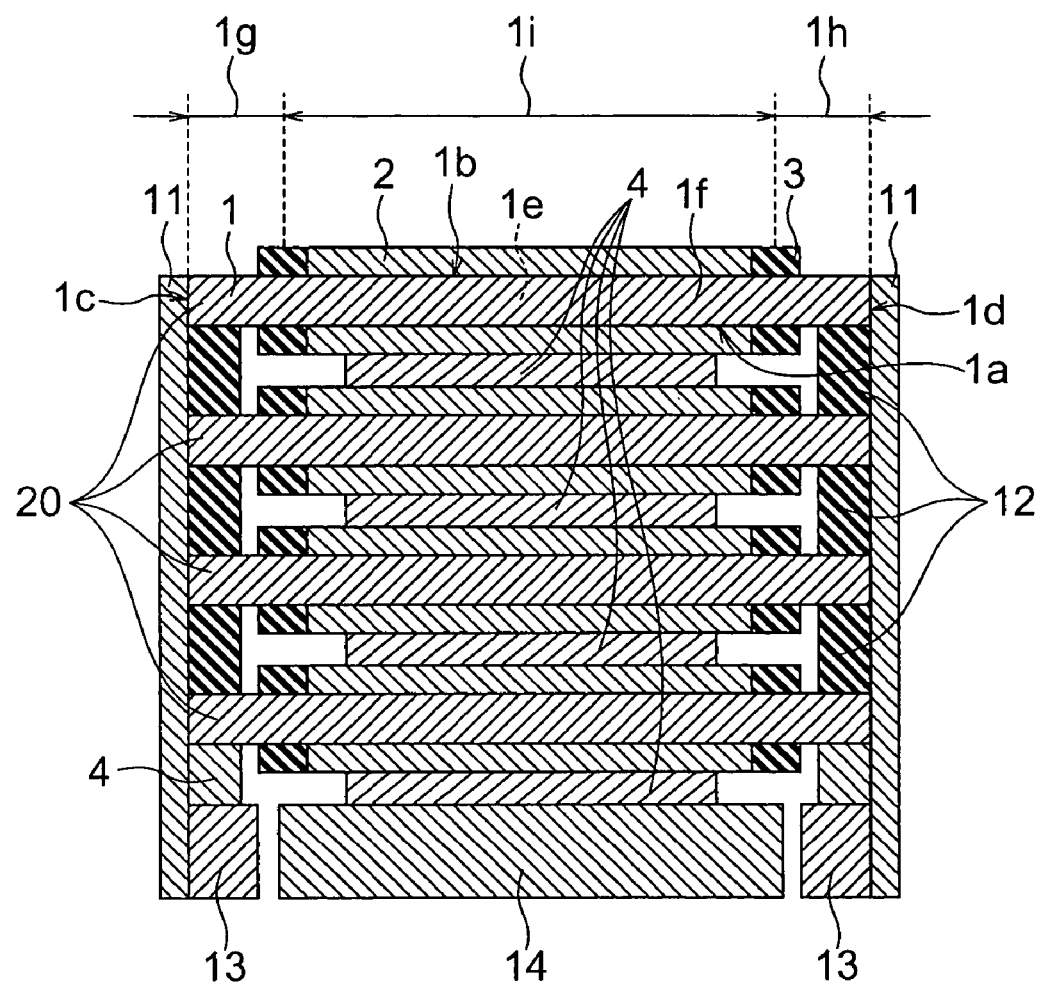
FIG. 10 is a sectional view showing a laminated transmission line device according to a fifth embodiment of this invention.

Referring to FIG. 10, in a laminated transmission line device according to a fifth embodiment of this invention, four transmission line elements 20 are laminated to one another.

Each of transmission line elements 20 is provided with an anode body 1, an oxidized film as a dielectric layer (not shown), a cathode body 2, and insulation resin members 3, like the transmission line element 20 shown in FIG. 2. Because the process of manufacturing each of the transmission line elements 20 is the same as the process described in conjunction with FIG. 2, detailed description thereof will be omitted.

The anode body 1 of each of the transmission line elements 20 has a substantially plate-shape provided with first and second plate surfaces 1*a* and 1*b* as lower and upper surface in FIG. 10, two side surfaces 1*e* and 1*f*, and first and second end surfaces 1*c* and 1*d* as left and right elevational surface in FIG. 10. The laminated transmission line device is structured by laminating four transmission line elements 20 onto one another in a thickness direction of the anode body 1. The anode body 1 is provided with a first end region 1*g* as a left region in FIG. 10, a second end region 1*h* as a right region, and an intermediate region 1*i*. The dielectric layer is served by the oxidized film formed over the first and the second plate surfaces 1*a* and 1*b* and the side surfaces 1*e* and 1*f* on the intermediate region 1*i* of each of the anode bodies 1. The cathode body is formed on the dielectric layer.

The first and the second end regions 1*g* and 1*h* of each of the anode bodies 1 of the transmission line elements 20 adjacent to each other are mechanically connected and electrically insulated to each other through an electrical insulation spacer 12, respectively. Because the first and the second regions 1*g* and 1*h* are mechanically connected to each other, the disadvantageous deformation of the anode body and the vicinity does not occur. In the present invention, even if the spacer can mechanically-connect between the anode bodies 1, the spacer may have an electrical insulation characteristic or not.

Furthermore, the first and the second end surfaces 1*c* and 1*d* of the anode bodies 1 of the transmission line elements 20 adjacent to each other are mechanically electrically connected to each other through an electrically conductive member 11.

Herein, the electrical insulation spacer 12 can be made from an adhesive, made of an adhesive sheet, and so on. Further, the adhesive can be served by electrical insulation adhesive or electrically-conductive adhesive. Also, the adhesive sheet can be served by an electrical insulation adhesive sheet or an electrically-conductive adhesive sheet.

Further, as the electrically conductive member 11, such as an evaporated metal film, a metal plating film, a metal plate, or an electrically conductive paste film can be used.

The cathode bodies 2 of the transmission line elements 20 adjacent to each other are mechanically electrically connected to each other through an electrically conductive adhesive 4.

A part of the first plate surface 1*a* of the anode body 1 of the transmission line element 20 undermost laminated and a part of an inside surface of a lower region of the electrically conductive member 11 are mechanically electrically connected to an anode terminal 13 made of a metal plate through the electrically conductive adhesive 4. Also, a part of a lower surface of the cathode body 2 of the transmission line element 20 undermost laminated is mechanically electrically connected to a cathode terminal 14 made of a metal plate through the electrically conductive adhesive 4.

Because the laminated transmission line device of the fifth embodiment comprises the above-mentioned structure, it is unnecessary to bend the end region of the anode body like the existing laminated transmission line device and thus the transmission line element may be not deteriorated.

Although four transmission line elements are laminated in the fifth embodiment, less or more than four transmission line elements may be laminated.

Sixth Embodiment

A sixth embodiment of this invention is an embodiment that metal caps are used as the electrically conductive members for electrically connecting between the first end surfaces of the anode bodies and between the second end surfaces of the anode bodies. The metal caps have a shape so as to cover a part or the entire of the first or the second end region of the anode body, respectively.

Figure 11A:
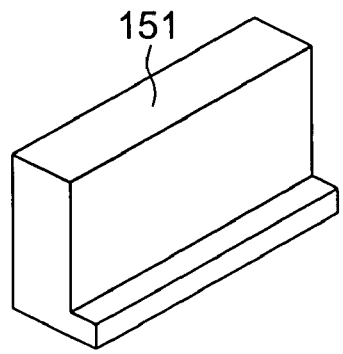
FIG. 11A is a perspective view showing a metal cap used in a sixth embodiment of this invention.
Figure 11B:
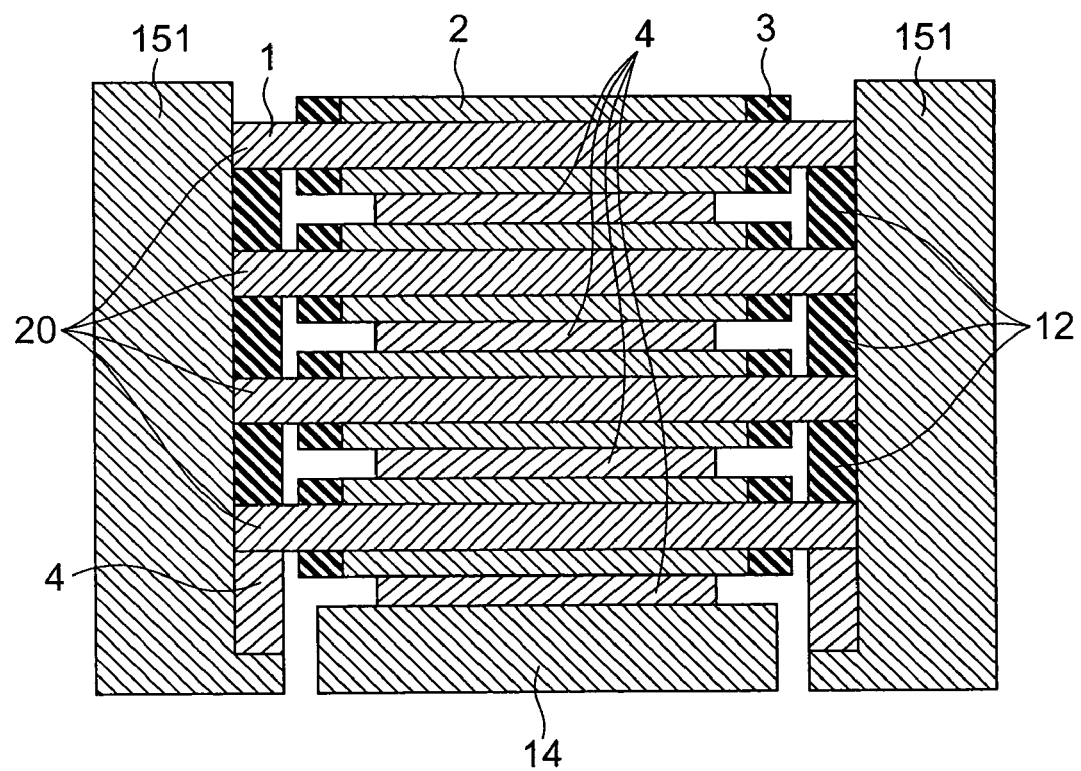
FIG. 11B is a sectional view showing a laminated transmission line device according to the sixth embodiment of this invention.

FIG. 11A shows a metal cap 151 used in the sixth embodiment. FIG. 11B is a sectional view of a laminated transmission line device using therein the metal cap 151.

Referring to FIG. 11B, the laminated transmission line device comprises four transmission line elements 20 laminated to one another. Each of transmission line elements 20 is provided with an anode body 1, an oxidized film as a dielectric layer (not shown), a cathode body 2, and insulation resin members 3, like the transmission line element 20 shown in FIG. 2.

The first and second end regions of the anode bodies 1 of the transmission line elements 20 adjacent to each other are mechanically connected and electrically insulated to each other through an electrical insulation spacer 12, respectively.

Furthermore, the first and the second end surfaces of the anode bodies 1 of the transmission line elements 20 adjacent to each other are mechanically electrically connected to each other through a metal cap 151. A lower region of the metal cap 151 serves as an anode terminal.

The cathode bodies 2 of the transmission line elements 20 adjacent to each other are mechanically electrically connected to each other through an electrically conductive adhesive 4.

A part of the first plate surface of the anode body 1 of the transmission line element 20 undermost laminated is mechanically electrically connected to a lower region of the metal cap 151 as the anode terminal through the electrically conductive adhesive 4. Also, a part of a lower surface of the cathode body 2 of the transmission line element 20 undermost laminated is mechanically electrically connected to a cathode terminal 14 made of a metal plate through the electrically conductive adhesive 4.

Figure 12A:
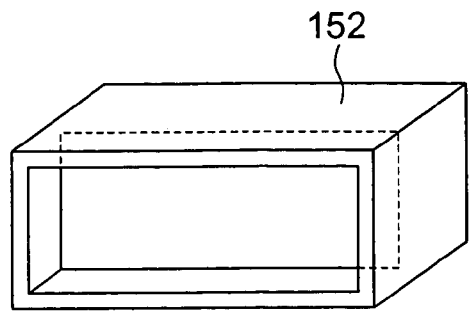
FIG. 12A is a perspective view showing another metal cap used in a variation of the sixth embodiment of this invention.
Figure 12B:
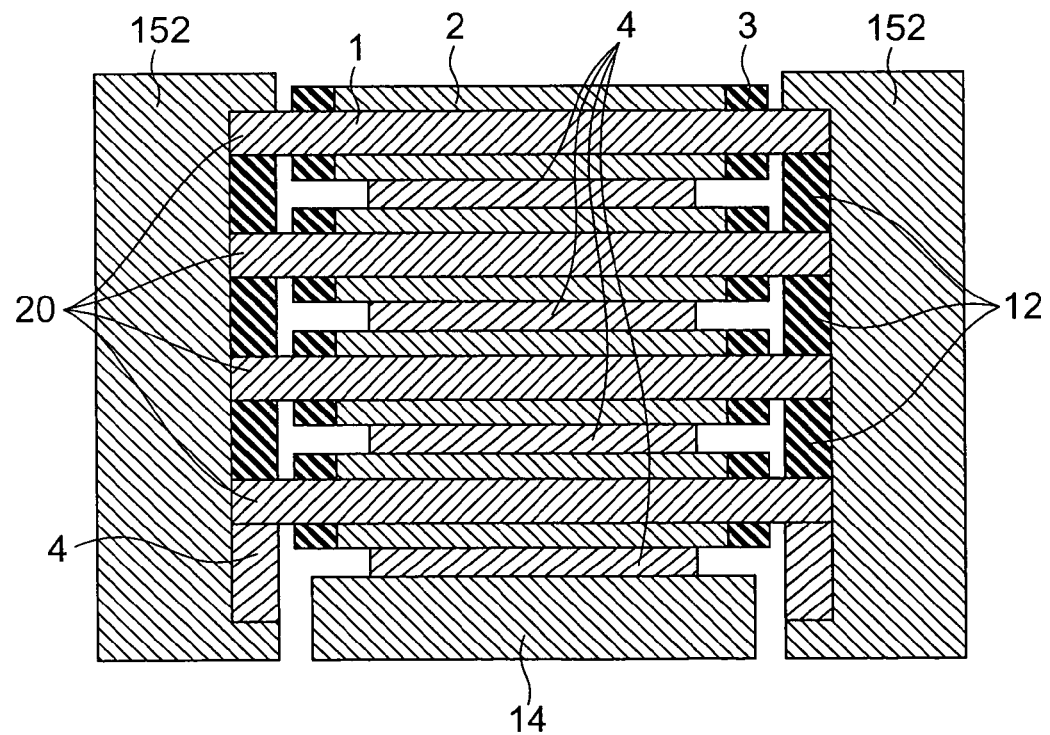
FIG. 12B is a sectional view showing another laminated transmission line device according to the variation of the sixth embodiment of this invention.

FIG. 12A shows a metal cap 152 used in another variation of the sixth embodiment. FIG. 12B is a sectional view of a laminated transmission line device using therein the metal cap 152.

Referring to FIG. 12B, the laminated transmission line device comprises four transmission line elements 20 laminated to one another. Each of transmission line elements 20 is provided with an anode body 1, an oxidized film as a dielectric layer (not shown), a cathode body 2, and insulation resin members 3, like the transmission line element 20 shown in FIG. 2.

The first and the second end regions of the anode bodies 1 of the transmission line elements 20 adjacent to each other are mechanically connected and electrically insulated to each other through an electrical insulation spacer 12, respectively.

Furthermore, the first and the second end surfaces of the anode bodies 1 of the transmission line elements 20 adjacent to each other are mechanically electrically connected to each other through a metal cap 152, respectively. A lower region of the metal cap 152 serves as an anode terminal.

The cathode bodies 2 of the transmission line elements 20 adjacent to each other are mechanically electrically connected to each other through an electrically conductive adhesive 4.

A part of the first plate surface of the anode body 1 of the transmission line element 20 undermost laminated is mechanically electrically connected to a lower region of the metal cap 152 as the anode terminal through the electrically conductive adhesive 4. The second plate surface of the anode body 1 of the transmission line element 20 uppermost laminated is mechanically electrically connected to an upper region of the metal cap 152 through the electrically conductive adhesive (not shown). Furthermore, although not shown, the side surfaces of each of the anode bodies 1 of the transmission line element 20 are mechanically electrically connected to side regions of the metal cap 152 through the electrically conductive adhesive.

Also, a part of a lower surface of the cathode body 2 of the transmission line element 20 undermost laminated is mechanically electrically connected to the cathode terminal 14 made of a metal plate through the electrically conductive adhesive 4.

Because the laminated transmission line device of the sixth embodiment comprises the above-mentioned structure, it is unnecessary to bend the end region of the anode body like the existing laminated transmission line device and thus the transmission line element may not be deteriorated.

Although four transmission line elements are laminated in the sixth embodiment, less or more than four transmission line elements may be laminated.

Seventh Embodiment

In a seventh embodiment of this invention, each of first and second end regions of an anode body of a transmission line element is previously bent in right angle by the use of a jig (not shown) before the elements are laminated on one another so that a first or a second plate surface serves as first and second end surfaces extended in area, respectively. Consequently, the area of the anode body contacting to an electrically conductive member is increased. When the contacting area is increased, the electrical resistance between the anode body and the electrically conductive member is reduced.

Figure 13:
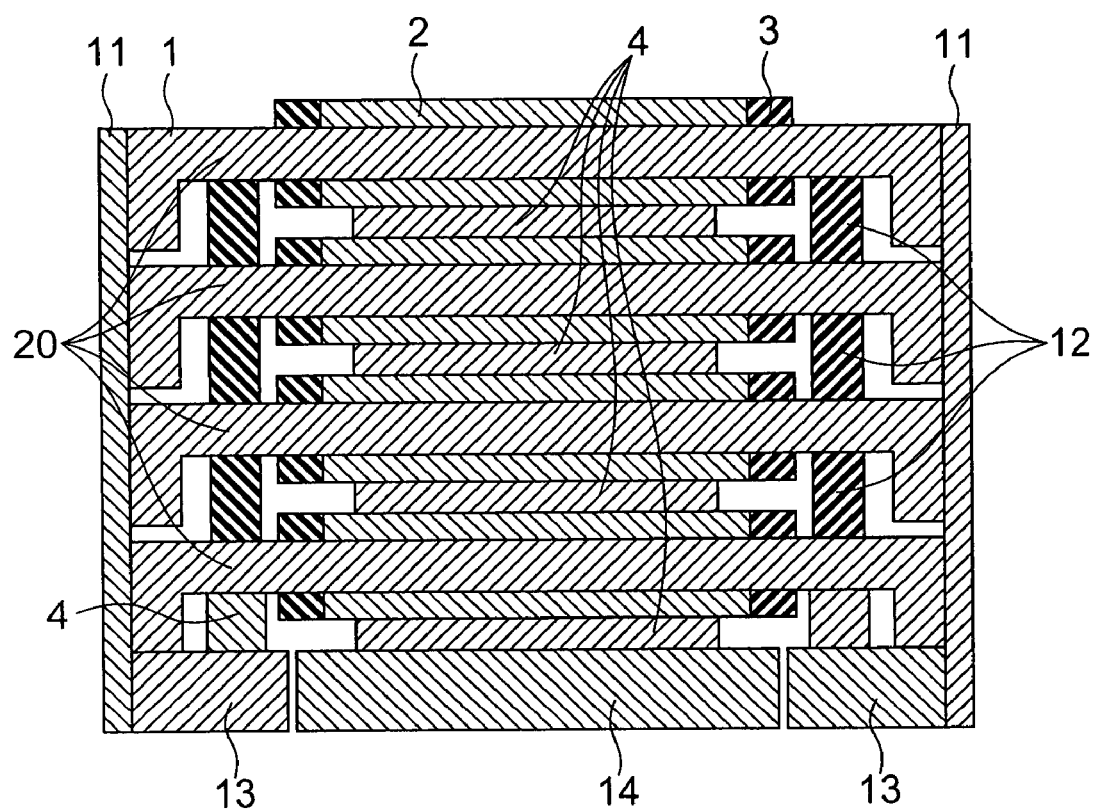
FIG. 13 is a sectional view showing a laminated transmission line device according to a seventh embodiment of this invention.

Referring to FIG. 13, the laminated transmission line device comprises four transmission line elements 20 laminated to one another. Each of transmission line elements 20 is provided with an anode body 1, an oxidized film as a dielectric layer (not shown), a cathode body 2, and insulation resin members 3, like the transmission line element 20 shown in FIG. 2.

The first and the second end regions of the anode bodies 1 of the transmission line elements 20 adjacent to each other are mechanically connected and electrically insulated to each other through an electrical insulation spacer 12, respectively.

Furthermore, the first and the second end surfaces of the anode bodies 1 of the transmission line elements 20 adjacent to each other are mechanically electrically connected to each other through an electrically conductive member 11, respectively.

The cathode bodies 2 of the transmission line elements 20 adjacent to each other are mechanically electrically connected to each other through an electrically conductive adhesive 4.

The first and the second end regions of each of the anode bodies 1 of the transmission line elements 20 are previously bent in right angle by the use of a jig (not shown) before the elements are laminated on one another so that the first or the second plate surface serves as the first and the second end surfaces extended in area, as shown in FIG. 13. Consequently, the area of the anode body 1 contacting to the electrically conductive member 11 is increased. When the contacting area is increased, the electrical resistance between the anode body 1 and the electrically conductive member 11 is reduced.

A part of the first plate surface of the anode body 1 of the transmission line element 20 undermost laminated and a part of an inside surface of a lower region of the electrically conductive member 11 are mechanically electrically connected to an anode terminal 13 made of a metal plate through the electrically conductive adhesive 4. Also, a part of a lower surface of the cathode body 2 of the transmission line element 20 undermost laminated is mechanically electrically connected to a cathode terminal 14 made of a metal plate through the electrically conductive adhesive 4.

Because the laminated transmission line device of the seventh embodiment comprises the above-mentioned structure, electrical conductivity between the anode body 1 and the electrically conductive member 11 is excellent and therefore the impedance of the laminated transmission line device is low. Further, because the first end region of the anode body 1 has been previously bent by the use of the jig before the elements are laminated on one another, stress caused by the bending is never reached the cathode body 2 formed on the anode body 1. Consequently, the oxidized film as the dielectric layer formed between the anode body 1 and the cathode body 2 is never damaged. Thus, the transmission line element is never deteriorated in performance.

Although four transmission line elements of four are laminated in the seventh embodiment, less or more than four transmission line elements may be laminated.

Eighth Embodiment

In the fifth to the seventh embodiments, the electrically conductive adhesive 4 is used for the connection between the cathode bodies 2 adjacent to each other and the connection between the cathode body 2 and the cathode terminal 14 adjacent to each other. In an eighth embodiment of this invention, another means is used for the connections.

Figure 14A:
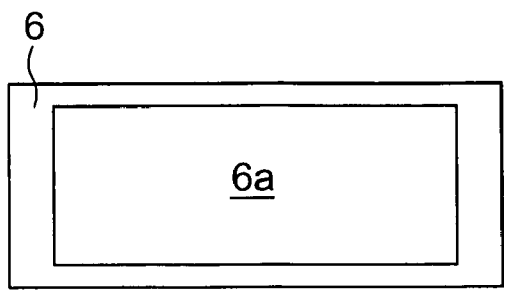
FIG. 14A is a plan view showing an electrical insulation adhesive sheet provided with a hole portion used in an eighth embodiment of this invention.
Figure 14B:
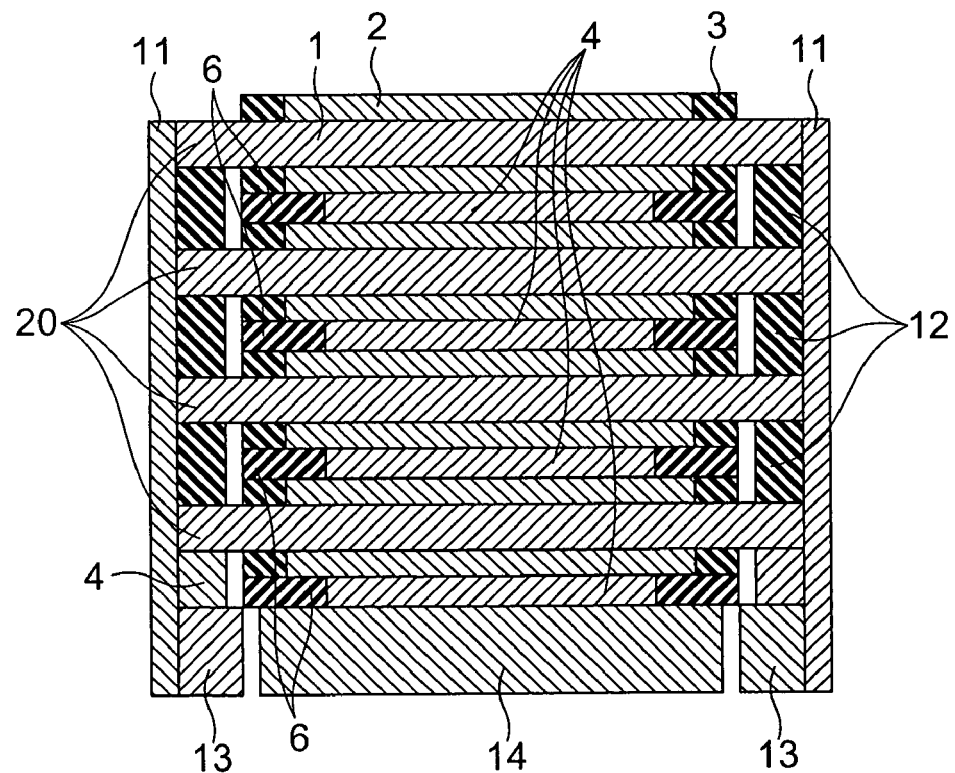
FIG. 14B is a sectional view showing a laminated transmission line device according to the eighth embodiment of this invention.

Referring to FIG. 14B, a laminated transmission line device according to the eighth embodiment comprises four transmission line elements 20 laminated to one another. Each of transmission line elements 20 is provided with an anode body 1, an oxidized film as a dielectric layer (not shown), a cathode body 2, and insulation resin members 3, like the transmission line element 20 shown in FIG. 2.

The first and the second end regions of the anode bodies 1 of the transmission line elements 20 adjacent to each other are mechanically connected and electrically insulated to each other through an electrical insulation spacer 12, respectively.

Furthermore, the first and the second end surfaces of the anode bodies 1 of the transmission line elements 20 adjacent to each other are mechanically electrically connected to each other through an electrically conductive member 11, respectively.

A part of the first plate surface of the anode body 1 of the transmission line element 20 undermost laminated and a part of an inside surface of a lower region of the electrically conductive member 11 are mechanically electrically connected to an anode terminal 13 made of a metal plate through the electrically conductive adhesive 4.

In the laminated transmission line device of the eighth embodiment, the cathode bodies 2 to one another as well as the cathode body 2 and a cathode terminal 14 are mechanically connected by an electrical insulation adhesive sheet 6 shown in FIG. 14A, respectively. The electrical insulation adhesive sheet 6 is excellent in adhesive properties more than the electrically conducive adhesive 4 and has a frame shape provided with a hole portion 6a. As shown in FIG. 14B, the electrically conductive adhesive 4 is filled in the hole portion 6a. The cathode bodies 2 to one another as well as the cathode body 2 and the cathode terminal 14 are electrically connected by the electrically conductive adhesive 4 filled in the hole portion 6a, respectively.

Figure 15A:
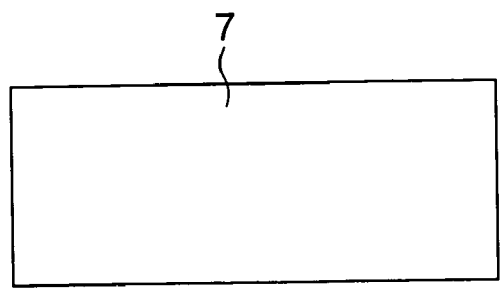
FIG. 15A is a plan view showing an electrical insulation adhesive sheet without a hole portion used in a variation of the eighth embodiment of this invention.
Figure 15B:
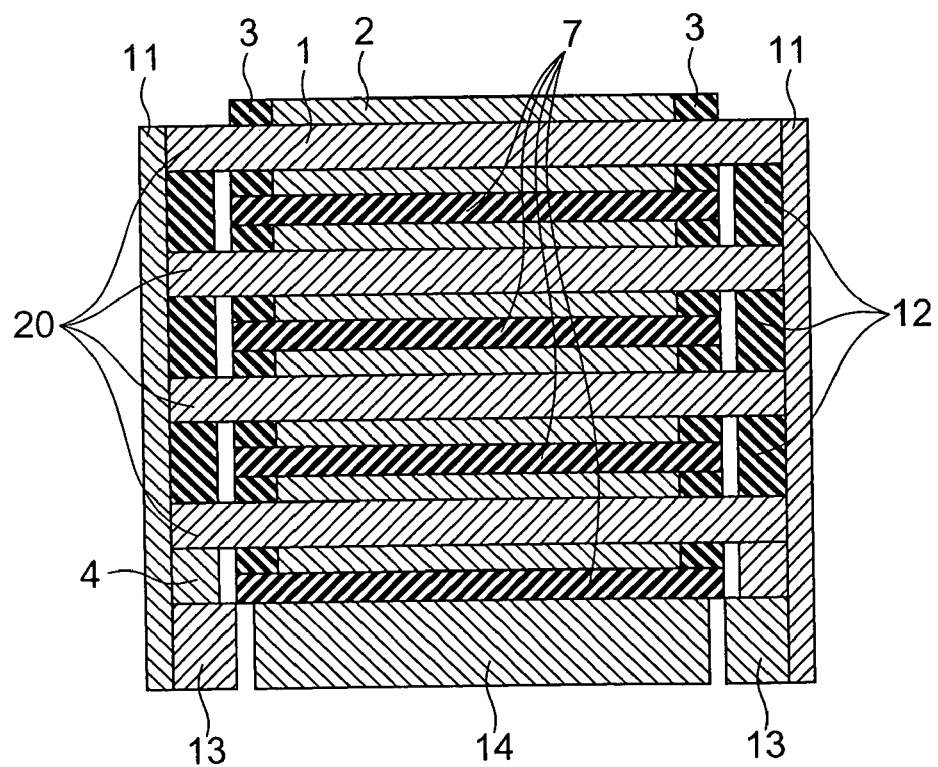
FIG. 15B is a sectional view showing another laminated transmission line device according to the variation o of the eighth embodiment of this invention.

Referring to FIG. 15B, in the laminated transmission line device of another embodiment of the eighth embodiment, the cathode bodies 2 to one another as well as the cathode body 2 and the cathode terminal 14 are mechanically connected by an electrical insulation adhesive sheet 7 shown in FIG. 15A instead of the electrical insulation adhesive sheet 6, respectively. The electrical insulation adhesive sheet 7 has a plate shape without a hole portion. The electrical insulation adhesive sheet 7 is excellent in adhesive properties more than the electrically conductive adhesive 4.

Each of the cathode bodies 2 of the transmission line elements 20 has a hollow plate shape provided with first and second plate surfaces as lower and upper surfaces in FIG. 9B and a pair of side surfaces. The first and second plate surfaces and the side surfaces of the cathode body 2 correspond to the first and second plate surfaces and the side surfaces of the anode body 1, respectively.

Figure 15C:
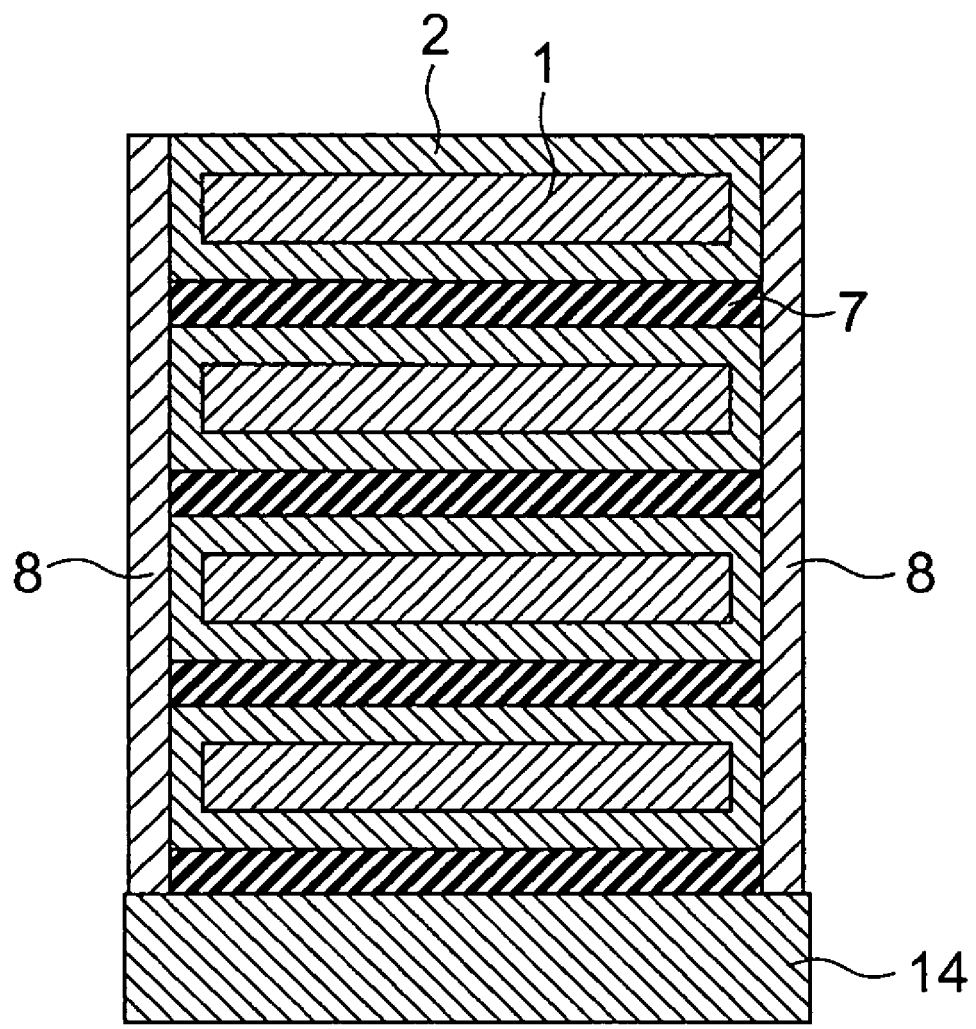
FIG. 15C is another sectional view showing another laminated solid electrolytic capacitor according to the variation of the variation of the eighth embodiment of this invention.

The cathode bodies 2 to one another and the cathode body 2 and the cathode terminal 14 are electrically connected by electrically connecting means, respectively. The electrically connecting means is arranged between the side surfaces of the cathode bodies 2 of the transmission line elements 20 laminated to one another. For example, the electrically connecting means is implemented by electrically conductive paste applied over the side surfaces of the laminated cathode bodies. In more concrete, electrically conductive paste layers 8 can be applied over a pair of the side surfaces of the cathode bodies 2 laminated on one another, respectively, as shown in FIG. 15C.

The laminated transmission line device illustrated in FIGS. 14B and 15B respectively comprise, for the connection between the cathode bodies 2 adjacent to each other and the connection between the cathode body 2 and the cathode terminal 14 adjacent to each other, the electrical insulation sheet 6 or 7 excellent in adhesive properties more than the electrically conducive adhesive 4. Thus, reliability and durability of the connection between the cathode bodies 2 adjacent to each other and the connection between the cathode body 2 and the cathode terminal 14 adjacent to each other are increased.

Because the laminated transmission line device of the sixth embodiment comprises the above-mentioned structure, it is unnecessary to bend the end region of the anode body like the existing laminated transmission line device and thus the transmission line element may not be deteriorated.

Although four transmission line elements are laminated in the eighth embodiment, less or more than four transmission line elements may be laminated.

So far, this invention has been described in conjunction with several examples. However, this invention is not restricted to the examples mentioned above but may be modified in various manners by those skilled in the art within the scope of this invention.

What is claimed is:

1. A laminated solid electrolytic capacitor comprising a plurality of solid electrolytic capacitor elements, said solid electrolytic capacitor elements being provided with an anode body, a dielectric layer, and a cathode body, respectively, said anode body having a substantially plate-shape provided with first and second plate surfaces, two side surfaces, and first and second end surfaces, said laminated solid electrolytic capacitor being structured by laminating said solid electrolytic capacitor elements onto one another in a thickness direction of the anode body;

said anode body being provided with first and second end regions and an intermediate region;
said dielectric layer being served by an oxidized film formed on said first and said second plate surfaces and said side surfaces in said intermediate and said second end regions and on said second end surface of said anode body;
said cathode body being formed on said dielectric layer;
said first end regions of said anode bodies of said solid electrolytic capacitor elements adjacent to each other being mechanically connected to each other through a spacer;
said first end surfaces of said anode bodies of said solid electrolytic capacitor elements adjacent to each other being electrically connected to each other through an electrically conductive member.

2. The laminated solid electrolytic capacitor according to claim 1, wherein said electrically conductive member is an evaporated metal film, a metal plating film, a metal plate, or an electrically conductive paste film.

3. The laminated solid electrolytic capacitor according to claim 1, wherein said electrically conductive member is structured by a metal cap;
said metal cap being connected to at least one of:
said first plate surface in said first end region of said anode body laminated on the lowermost layer;
said second plate surface in said first end region of said anode body laminated on the uppermost layer; and
said surfaces in said first end region of said anode bodies laminated on one another.

4. The laminated transmission line device according to claim 1, wherein said spacer is made from an adhesive or made of an adhesive sheet.

5. The laminated transmission line device according to claim 1, wherein said spacer is made from electrical insulation adhesive or made of an electrical insulation adhesive sheet.

6. The laminated solid electrolytic capacitor according to claim 1, wherein said first end regions of said anode bodies are previously bent in right angle so that said first or said second plate surfaces serve as the first end surfaces extended in area, respectively.

7. The laminated solid electrolytic capacitor according to claim 1, wherein the cathode bodies adjacent to each other in said thickness direction of said laminated solid electrolytic capacitor are mechanically electrically connected to each other by electrically conductive adhesive.

8. The laminated solid electrolytic capacitor according to claim 1, wherein said the cathode bodies adjacent to each other in said thickness direction of said laminated solid electrolytic capacitor are mechanically connected to each other through an electrical insulation adhesive sheet provided with a hole portion and electrically connected to each other through electrically conductive adhesive filled in said hole portion.

9. The laminated solid electrolytic capacitor according to claim 1, wherein said cathode body has a hollow plate shape provided with first and second plate surfaces, a pair of side surfaces, and a second end surface respectively corresponding to said first and said second plate surfaces, said side surfaces, and said second end surface of said anode body;
said first plate surface of the cathode body and said second plate surface of the cathode body adjacent to each other in said thickness direction of said laminated solid electrolytic capacitor being mechanically connected to each other through electrical insulation adhesive or an electrical insulation adhesive sheet;
the side surfaces and/or the second end surface of the cathode bodies adjacent to each other in said thickness direction of said laminated solid electrolytic capacitor are electrically connected to each other through electrically conductive adhesive.

10. The laminated solid electrolytic capacitor according to claim 1, wherein said anode body is made of:
a metal plate made from valve function metal and having a porous surface structure; or
a metal plate made from valve function metal and having a porous surface structure and a metal layer made from valve function metal powder and formed on said metal plate;
said cathode body being made of:
a solid electrolytic layer formed on said oxidized film, a graphite layer formed on said solid electrolytic layer, and a silver paste layer formed on said graphite layer;
a solid electrolytic layer formed on said oxidized film, a graphite layer formed on said solid electrolytic layer, and a metal plating layer formed on said graphite layer; or
a solid electrolytic layer formed on said oxidized film and a metal plating layer formed on said solid electrolytic layer.

11. A laminated transmission line device comprising a plurality of transmission line elements, said transmission line elements being provided with an anode body, a dielectric layer, and a cathode body, respectively, said anode body having a substantially plate-shape provided with first and second plate surfaces, two side surfaces, and first and second end surfaces, said laminated transmission line device being structured by laminating said transmission line elements onto one another in a thickness direction of the anode body;
said anode body being provided with first and second end regions and an intermediate region;
said dielectric layer being served by an oxidized film formed on said first and said second plate surfaces and said side surfaces in said intermediate region of said anode body;
said cathode body being formed on said dielectric layer;
said first end regions of said anode bodies of said transmission line elements adjacent to each other being mechanically connected to each other through a spacer;
said second end regions of said anode bodies of said transmission line elements adjacent to each other are mechanically connected to each other through the spacer;
said first end surfaces of said anode bodies of said transmission line elements adjacent to each other being electrically connected to each other through an electrically conductive member;
said second end surfaces of said anode bodies of said transmission line elements adjacent to each other being electrically connected to each other through the electrically conductive member.

12. The laminated transmission line device according to claim 11, wherein said electrically conductive member is an evaporated metal film, a metal plating film, a metal plate, or an electrically conductive paste film.

13. The laminated transmission line device according to claim 11, wherein said electrically conductive member is structured by first and second metal caps;
said first metal cap being connected to at least one of:
said first plate surface in said first end region of said anode body laminated on the lowermost layer;
said second plate surface in said first end region of said anode body laminated on the uppermost layer; and
said surfaces in said first end region of said anode bodies laminated on one another;
said second metal cap being connected to at least one of:
said first plate surface in said second end region of said anode body laminated on the lowermost layer;
said second plate surface in said second end region of said anode body laminated on the uppermost layer; and
said surfaces in said second end region of said anode bodies laminated on one another.

14. The laminated transmission line device according to claim 11, wherein said spacer is made from an adhesive or made of an adhesive sheet.

15. The laminated transmission line device according to claim 11, wherein said spacer is made from electrical insulation adhesive or made of an electrical insulation adhesive sheet.

16. The laminated transmission line device according to claim 11, wherein said first end regions of said anode bodies are previously bent in right angle so that said first or said second plate surfaces serve as the first end surfaces extended in area, respectively;
said second end regions of said anode bodies are previously bent in right angle so that said first or said second plate surfaces serve as the second end surfaces extended in area, respectively.

17. The laminated transmission line device according to claim 11, wherein said cathode bodies adjacent to each other in said thickness direction of said laminated transmission line device are mechanically electrically connected to each other by electrically conductive adhesive.

18. The laminated transmission line device according to claim 11, wherein said cathode bodies adjacent to each other in said thickness direction of said laminated transmission line device are mechanically connected to each other through an electrical insulation adhesive sheet provided with a hole portion and electrically connected to each other through an electrically conductive adhesive filled in said hole portion.

19. The laminated transmission line device according to claim 11, wherein said cathode body has a hollow plate shape provided with first and second plate surfaces and a pair of side surfaces respectively corresponding to said first and said second plate surfaces and said side surfaces of said anode body;
said first plate surface of the cathode body and said second plate surface of the cathode body adjacent to each other in said thickness direction of said laminated transmission line device being mechanically connected to each other through electrical insulation adhesive or an electrical insulation adhesive sheet;

the side surfaces of the cathode bodies adjacent to each other in said thickness direction of said laminated solid electrolytic capacitor are electrically connected to each other through an electrically conductive adhesive.

20. The laminated transmission line device according to claim 11, wherein said anode body is made of:
- a metal plate made from valve function metal and having a porous surface structure; or
- a metal plate made from valve function metal and having a porous surface structure and a metal layer made from valve function metal powder and formed on said metal plate;

said cathode body being made of:
- a solid electrolytic layer formed on said oxidized film, a graphite layer formed on said solid electrolytic layer, and a silver paste layer formed on said graphite layer;
- a solid electrolytic layer formed on said oxidized film, a graphite layer formed on said solid electrolytic layer, and a metal plating layer formed on said graphite layer; or
- a solid electrolytic layer formed on said oxidized film and a metal plating layer formed on said solid electrolytic layer.

* * * * *